Patented Sept. 29, 1931

1,825,646

UNITED STATES PATENT OFFICE

JAMES W. MARTIN, JR., OF YONKERS, NEW YORK, ASSIGNOR, BY MESNE ASSIGNMENTS, TO DRYICE EQUIPMENT CORPORATION, OF NEW YORK, N. Y., A CORPORATION OF DELAWARE

METHOD OF CRYSTALLIZATION

No Drawing.   Application filed November 22, 1927.   Serial No. 235,041.

My present method concerns a method for accelerating crystallization of solids in liquid solution.

There are unnumerable industrial operations that depend on causing crystallization in solutions that are of crystallizable constituency and concentration; and the known ways of producing or accelerating it commonly employed either singly or in combination, include concentrating the solution by evaporation; agitating the solution; and lowering its temperature.

One homely example is the case of a bowl of sugar solution prepared of proper concentration for cake icing. A small piece of solid carbon dioxide placed in the solution operates to quickly crystallize the whole and render the mass ready to spread on the cake.

The same method is applicable to syrups and various candy mixes. The frozen carbon dioxide can be used in such quantity as necessary to cool the solution as quickly as may be desired. This results in extremely small crystals giving a very smooth consistency to the product.

Another use is for crystallizing substances to separate them from the liquid and this expedient may be practiced in connection with any properly concentrated, crystallizable solution in which the carbon dioxide gas is not harmful to the product. The quick cooling and the stirring action caused by the escaping carbon dioxide gas, both tend to materially hasten crystallization and make smaller crystals.

I believe this method of causing intense, minutely localized cooling by film contact with intensely cold gas, particularly in mobile bubble formation is radically new and is a most effective way of rapidly forming crystals of relatively small sizes.

While my method is applicable to solutions crystallizable at normal or high temperatures, it is also applicable to any solution requiring very low temperatures, the sublimation point of the solid carbon dioxide being approximately 110 degrees below zero Fahrenheit.

I claim:

1. The method of accelerating crystallization and making small crystals, which consists in liberating freshly sublimated, intensely cold carbon dioxide gas in a solution of crystallizable constituency and concentration at extremely low temperature, within said solution to produce simultaneous agitation and freezing therein.

2. The method of accelerating crystallization and making small crystals in a solution of crystallizable constituency and concentration, which consists in submerging frozen carbon dioxide within said solution to generate carbon-dioxide gas and produce simultaneous agitation and solidification in said solution.

3. The method of accelerating crystallization and making small crystals in a saturated sugar solution which consists in submerging solid carbon dioxide and thereby liberating carbon-dioxide gas at extremely low temperature within said solution to produce simultaneous agitation and freezing therein.

4. The method of accelerating crystallization in solutions that are of crystallizable constituency and concentration which is characterized by subjecting said solutions to intense, minutely localized cooling by film contact with bubbles of an intensely cold gas.

5. The method of accelerating crystallization and making small crystals in a liquid of crystallizable constituency and concentration which consists in submerging frozen carbon dioxide within said liquid and subjecting said liquid to intense local cooling by film contact with bubbles of extremely cold carbon dioxide gas sublimated from said frozen carbon dioxide.

Signed at New York city, in the county of New York, and State of New York, this 19th day of November, A. D. 1927.

JAMES W. MARTIN, JR.

CERTIFICATE OF CORRECTION.

Patent No. 1,825,646.             Granted September 29, 1931, to

JAMES W. MARTIN, JR.

It is hereby certified that error appears in the printed specification of the above numbered patent requiring correction as follows: In claim 1, lines 54 and 55, strike out the words "in a solution of crystallizable constituency and concentration" and insert the same to follow after the word "crystals" in line 52, same claim; and that the said Letters Patent should be read with this correction therein that the same may conform to the record of the case in the Patent Office.

Signed and sealed this 15th day of December, A. D. 1931.

(Seal)                                          M. J. Moore,
                                             Acting Commissioner of Patents.